April 1, 1952 A. J. BENT 2,591,118
VALVE DEVICE
Filed Nov. 30, 1949
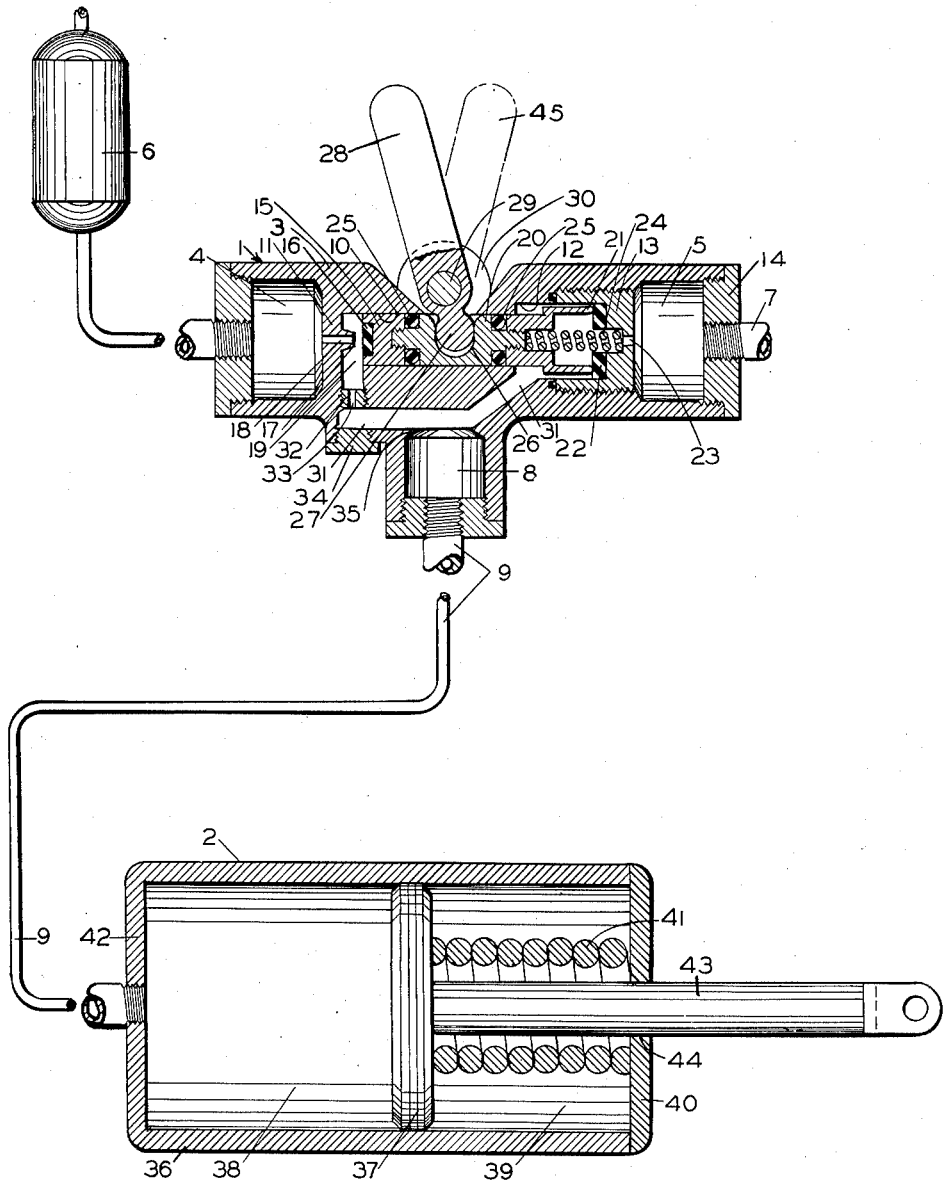
INVENTOR.
ARTHUR J. BENT
BY
Frank E. Miller
ATTORNEY Patented Apr. 1, 1952

2,591,118

UNITED STATES PATENT OFFICE 2,591,118

VALVE DEVICE

Arthur J. Bent, Penn Township, Allegheny County, Pa., assignor to Westinghouse Air Brake Company, a corporation of Pennsylvania Application November 30, 1949, Serial No. 130,259

3 Claims. (Cl. 121—46.5)

This invention relates to a manually operative control valve device and more particularly to the snap acting type.

One object of the invention is to provide an improved valve device of the above type.

Another object of the invention is to provide a relatively small, easily, manually operated snap acting valve device for controlling, such as from the pilot's compartment of an airplane, the operation of any remotely located two position device such as the valve in a fuel line on the plane or the operation of a plane bomb door or landing gear.

Other objects and advantages will be apparent from the following more detailed description of the invention.

In the accompanying drawing, the single figure is a diagrammatic view, mainly in section, of a fluid pressure control system embodying, in vertical section, a control device constructed in accordance with one embodiment of the invention.

Description

As shown in the drawing, a control valve device 1, embodying the invention, is, for the purpose of illustrating one use of the invention, arranged to control a single acting fluid pressure motor 2.

The control valve device 1 comprises a body 3 constructed generally in the form of a pipe T having at opposite ends chambers 4 and 5 open, respectively, to a source of fluid under pressure such as may be contained in a reservoir 6, and to atmosphere or a sump by way of a pipe 7. In the leg of the T is a chamber 8 open to a pipe 9.

The body 3 has a bore 10 extending in the direction of the opposite ends of the T, one end of said bore being separated from chamber 4 by a wall 11, while the opposite end of said bore opens to the bottom of a counterbore 12 separated from one end of chamber 5 by a valve seat element 13 secured in said body by screw-threaded engagement. The opposite end of chamber 5 is closed by a removable cap 14 to which the pipe 7 is connected.

Slidably mounted in the bore 10 is a valve element 15 one end of which carries a valve 16 for cooperation with a seat 17 provided in the partition wall 11 around a passage 18 extending through said wall from chamber 4 to a chamber 19 formed between said wall and the said end of said valve. The opposite end of valve element 15 is connected by an element 20 slidable in bore 10 to a valve 21 of greater cross-sectional area than valve element 15 and disposed within counterbore 12 and having a diameter less than said counterbore, said valve being arranged to cooperate with a resilient seat 22 carried by element 13 and encircling a vent port 23 leading to chamber 5. For a reason which will hereinafter appear the size of the vent port 23 is made such that its cross-sectional area is less than the difference between the cross-sectional areas of the bore 12 and of the valve 21. A spring 24 supported at one end on the element 20 and bearing against the seat element 13, acts on the valve 21 for urging it in a direction away from said seat element and to a position in which the valve 16 is seated on its seat 17 to close the communication through the bore 18 between the chambers 4 and 19.

Clamped between the element 20 and the valve element 15 and valve 21 are, respectively, two gasket rings 25 each having sealing and sliding contact with the wall of the bore 10.

Disposed in a recess 26 formed in the element 20 is one end 27 of an operator's handle 28 which is fulcrumed on a pin 29 carried by a lug 30 formed integral with the body 3.

Formed in the body 3 is a passageway 31 opening at its right hand end into the counterbore 12. Screw-threaded in the casing adjacent the chamber 19 is a choke fitting 32 having a bore 33 opening said chamber to the left hand end of passageway 31. To provide for assembling the choke 32 in the passageway 31 and to permit the removal of said choke a plug 34, located coaxial with said coke, is screw-threaded into the body 3. The passageway 31 is open through a port 35 to chamber 8.

The single acting fluid pressure motor 2 comprises a cup shaped cylinder body 36 and a piston 37 adapted for reciprocation within said cylinder. The piston 37 divides the cylinder into two chambers 38 and 39, the chamber 38 being connected by the pipe 9 to the chamber 8 of the control valve device 1. Disposed in the chamber 39 between the piston 37 and a pressure head 40 is a return spring 41 for urging the piston 37 in the direction of the left hand toward a wall 42 constituting a part of the cylinder body 36. Secured to the piston 37 is a piston rod 43 which projects through a bore 44 in the pressure head 40. The piston rod 43 may be connected through suitable links or levers (not shown) to a fuel supply valve, a bomb door or any other device which it is desired to operate.

Operation

In operation, let it be assumed that the reservoir 6 is charged with fluid under pressure and that handle 28 occupies the position indicated by a dash and dot line 45. In this position of the handle 28 the supply valve 16 will be seated on the seat 17 by the spring 24 to close communication between the chamber 4 and the chamber 19, and the exhaust valve 21 will be moved out of engagement with the seat 22 to establish a fluid pressure communication between the counterbore 12 and the chamber 5 through the port 23 in the valve seat element 13. With a fluid pressure communication established between the counterbore 12 and the chamber 5, the chamber 38 in the fluid motor 2 will be vented to pipe 7 through pipe 9, chamber 8, passageway 31, counterbore 12, vent port 23, and chamber 5. With chamber 38 thus vented, the spring 41 will be rendered effective to force the piston 37 and rod 43 in the direction of the left hand until the piston 37 engages the wall 42. The fuel supply valve or other device (not shown) which may be operatively connected to the piston rod 43 will thus be moved to one position.

When it is desired to move the fuel supply valve or other device connected to the piston rod 43 to another position, the pilot will rock the handle 28 counter-clockwise about the pin 29 from the position indicated by the dot and dash line 45 toward the position in which it is shown in the drawing. As the handle 28 is thus rocked in a counter-clockwise direction, the end 27 thereof will be forced against the right hand side of the recess 26, to cause the element 20 to slide in the bore 10 in the direction of the right hand against the force of the spring 24, thereby pulling the valve 16 away from the seat 17 and moving valve 21 in the direction of the seat 22. Upon the valve 16 moving out of engagement with its seat 17, a fluid pressure communication is established between the chambers 4 and 19 whereupon fluid under pressure from the reservoir 6, which is present in the chamber 4, flows into the chamber 19 and thence through choke 32 to passage 31. The choke 32 however prevents the flow of fluid under pressure from the chamber 19 to the passageway 31 and chamber 8 as rapidly as it is supplied to the chamber 19 through the passage 18 in the wall 11. Therefore, there will be a rapid rise in pressure in the chamber 19. As soon as the valve 16 moves out of engagement with the seat 17 the entire area of the valve element 15 is subjected to the pressure of fluid in the chamber 19. The rapid rise in pressure in the chamber 19 combined with the comparatively large area of the valve 15 now exposed to such pressure, quickly produces a force sufficient to overcome the force of the spring 24. This force acting on the valve element 15 in the direction of the right hand displaces said valve element, the element 20 and the exhaust valve 21 in said direction with a snap action until the exhaust valve 21 engages the seat 22. Upon the exhaust valve 21 engaging the seat 22 the exhaust communication between the chamber 8 and the chamber 5 is closed. Therefore, the fluid under pressure supplied from chamber 19 to passageway 31 and chamber 8 through the choke 32 at a rate controlled according to the size of the bore 33 in said choke will flow into pipe 9 and thence to the chamber 38 at the left hand side of the piston 37. As fluid under pressure is thus supplied to the chamber 38, piston 37 will be displaced in the direction of the right hand against the force of the spring 41 until the fuel supply valve or other device connected to the piston rod 43 reaches its other position.

The fluid under pressure supplied to the passageway 31 through the choke 32 upon the unseating of the supply valve 16 from its seat 17 also flows to the counterbore 12 and there acts upon the valve 21. The valve 21 being of greater area than valve 16 is thus pressed against the seat 22 by the combined forces of fluid under pressure acting on the difference in areas of said valves plus its action in chamber 19 on the valve element 15 whereby the valve 16 will be positively held open.

From the foregoing description it is apparent that it is only necessary for the pilot to rock the handle 28 in a counter-clockwise direction a distance sufficient to unseat the valve 16 whereupon said valve and the exhaust valve 21 will snap to the position in which they are shown in the drawing and remain in such position independently of manual force on said handle.

With the parts of the valve device 1 and fluid motor 2 occupying the position in which they are shown in the drawing, let it be assumed that the pilot desires to move the fuel supply valve or other device connected to the piston rod 43 to its hereinbefore first mentioned one position. To accomplish this, the pilot will rock the handle 28 clockwise about the pin 29 from the position in which it is shown in the drawing toward the position indicated by the dot and dash line 45. As the handle 28 is thus rocked in a clockwise direction, the end 27 thereof will be forced against the left hand wall of the recess 26 and the valve element 15, the element 20, and the valve 21 will be displaced in the direction of the left hand. The initial movement of the valve 21 away from the seat 22 establishes a fluid pressure communication between the passageway 31 and the right hand side of the valve 21 through the clearance space between the valve 21 and the wall of the bore 12.

Fluid under pressure present in passageway 31 and chamber 8 will then suddenly flow to the right hand side of valve 21. As has been hereinbefore explained, the area of the vent port 23 is less than the area of the clearance space between the bore 12 and the valve 21. Therefore fluid under pressure cannot escape from the chamber at the right hand side of the valve 21 as fast as it is being supplied thereto and the pressure will rapidly rise in said chamber to substantial equalization with the pressure in passageway 31. Upon the pressure acting on the right hand side of the valve 21 becoming substantially equal to that in the passageway 31, the pressure in the passageway 31 acting on the area of valve 31 in excess of the area of valve element 15 is no longer effective to bias said valve in the direction of the right hand, while the pressure acting on the right hand side of the valve 21 over an area equal to the area of the valve element 15, supplements the force of spring 24 to provide a force which will displace the element 20, valve element 15, and valve 21 in the direction of the left hand with a snap action until the valve 16 engages the seat 17. Upon the valve 16 engaging the seat 17 the supply communication between the reservoir 6 and the passageway 31 is closed. Therefore the fluid under pressure present in the chamber 19 around the valve seat 17, in passageway 31, and also in the chamber 8, pipe 9 and chamber 38 of motor 2 will flow through the clearance space between the wall of bore 12 and the shouldered portion of the valve 21, thence through the vent port 23 to chamber 5 from whence it flows through the pipe 7 to the sump or atmosphere until the pressure in the chamber 38 has reduced to the pressure in the sump or to atmospheric pressure. This venting of fluid under pressure from chamber 19 after seating of valve 16 will render the spring 24 effective to positively hold said valve seated.

As the pressure in the chamber 38 is reduced as explained in the preceding paragraph, the spring 41 is rendered effective to displace the piston 37 and rod 43 in the direction of the left hand back to the one position above mentioned defined by said piston engaging the wall 42.

Summary

It will now be seen that I have provided a manually operative control valve device having means operative to move either a supply valve or an exhaust valve into engagement with its respective seat with a snap action, upon movement of the other valve out of engagement with its seat by manual means.

Having now described my invention, what I claim as new and desire to secure by Letters Patent, is:

1. A fluid pressure control valve device comprising a casing having a fluid pressure supply chamber, a fluid pressure delivery chamber, and a third chamber, a choke communication connecting said delivery and third chamber, a passageway connecting said supply and third chambers, a supply valve element comprising a valve for controlling communication through said passageway and having an area greater than that of said passageway exposed to said third chamber, a spring acting on said valve element with force sufficient to hold said valve seated against pressure of fluid in said passageway but less than the force resultant from pressure of fluid in said third chamber acting on said greater area, a fourth chamber, a restricted vent for said fourth chamber, a release valve connected for movement with and of greater area than said supply valve element controlling communication between said delivery chamber and said vent and subject when seated to atmospheric pressure from said vent which opposes pressure in said delivery chamber acting on said release valve plus pressure in said third chamber acting on said supply valve element, and a manually operative lever for selectively unseating either said supply valve or said release valve.

2. A fluid pressure control valve device comprising a casing having a fluid pressure supply chamber, a fluid pressure delivery chamber, and a third chamber, a choked communication connecting said third chamber and said delivery chamber, a passageway having a capacity greater than that of said choked communication connecting said supply and third chambers, a plunger slidably mounted in said casing, a supply valve carried by said plunger and having an area greater than that of said passageway for controlling communication through said passageway between said supply chamber and said third chamber, an exhaust valve seat, an exhaust valve carried by said plunger and having a shouldered area subjected to pressure in said delivery chamber and so disposed as to render such pressure and pressure in said third chamber acting on said supply valve effective to actuate said plunger to move said exhaust valve in the direction of and into engagement with said exhaust valve seat, a vent in said exhaust valve seat for connecting said delivery chamber to atmosphere upon movement of said exhaust valve out of engagement with said seat, and a manually operative lever connected to said plunger for selectively unseating either said supply valve or said exhaust valve.

3. A fluid pressure control valve device comprising a casing having a fluid pressure supply chamber, a fluid pressure delivery chamber, and a third chamber, a passageway connecting said supply chamber and said third chamber, a plunger slidably mounted in said casing, a supply valve carried by said plunger and having an area greater than that of said passageway for controlling communication through said passageway, a choked communication connecting said third chamber to said delivery chamber to render a rapid build-up of pressure in said third chamber upon said supply valve opening communication through said passageway, a fourth chamber, a restricted vent for said fourth chamber, an exhaust valve carried by said plunger and having a greater area than said supply valve controlling communication between said delivery chamber and said vent, and when seated subject on one side to atmospheric pressure and on the other side to the combined force of pressures in said third and delivery chambers, and a manually operative lever connected to said plunger for selectively unseating either said supply valve or said exhaust valve.

ARTHUR J. BENT.

REFERENCES CITED

The following references are of record in the file of this patent:

UNITED STATES PATENTS

| Number | Name | Date |
|---|---|---|
| 1,927,153 | Conrader | Sept. 19, 1933 |